Figure 1:
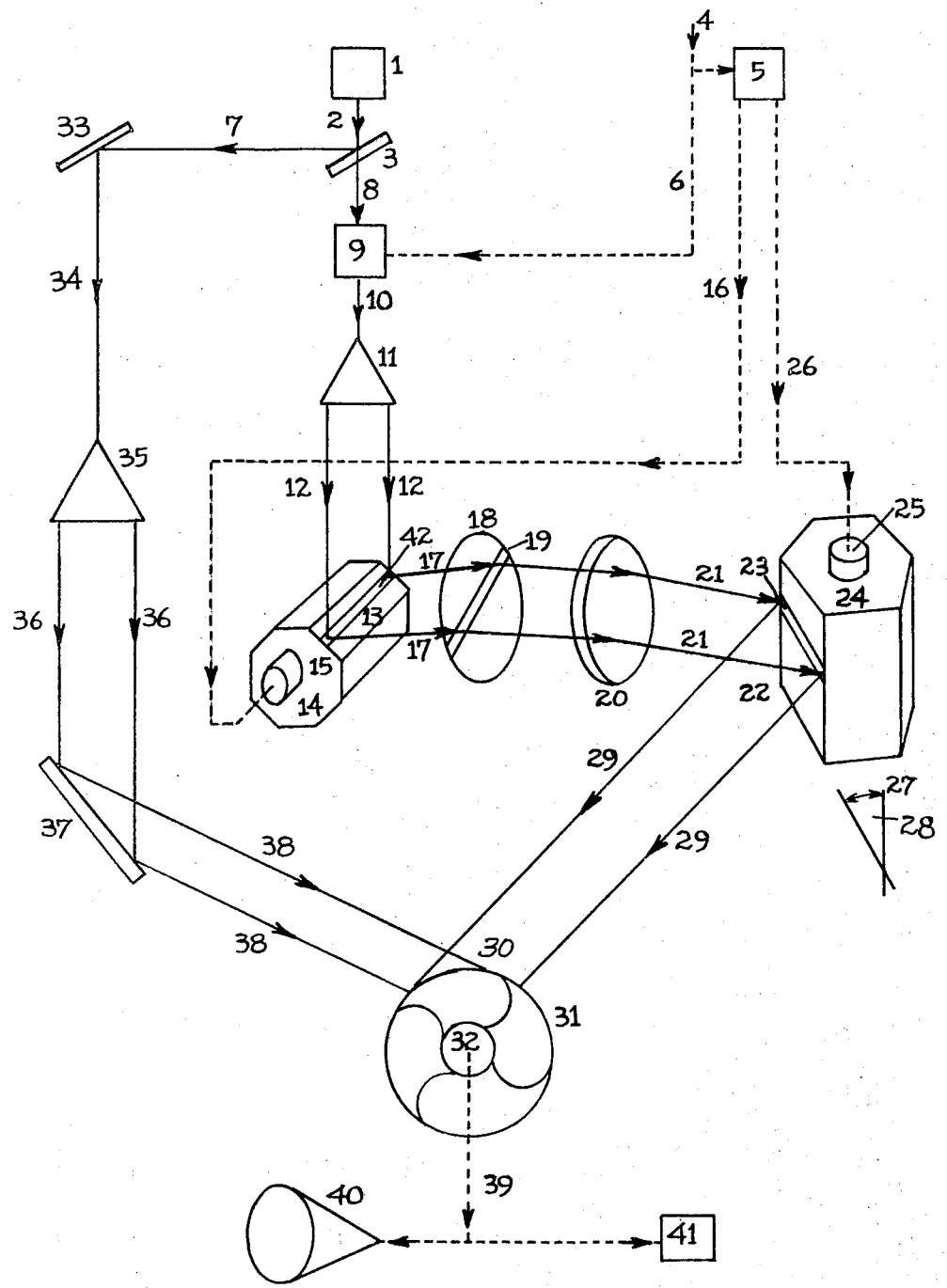

United States Patent [19]
Klahr

[11] 3,809,873
[45] May 7, 1974

[54] OPTICAL PROCESSOR FOR CONVOLUTION FILTERING

[76] Inventor: Carl N. Klahr, 678 Cedar Lawn Ave., Lawrence, N.Y. 11559

[22] Filed: Nov. 3, 1972

[21] Appl. No.: 303,313

Related U.S. Application Data
[63] Continuation-in-part of Ser. No. 157,445, June 28, 1971, abandoned.

[52] U.S. Cl. ...... 235/181, 343/100 CL, 350/162 SF
[51] Int. Cl. .......................... G06g 7/19, G06g 9/00
[58] Field of Search........... 235/181; 350/160, 96 B, 350/161, 162 SF; 324/77 A, 77 B, 77 K; 340/15.5; 343/100 CL

[56] References Cited
UNITED STATES PATENTS

| | | | |
|---|---|---|---|
| 3,700,902 | 10/1972 | Buchan | 350/162 SF |
| 3,688,101 | 8/1972 | Henning | 235/181 |
| 3,658,420 | 4/1972 | Axelrod | 350/162 SF |
| 3,636,261 | 1/1972 | Preston, Jr. | 350/162 SF |
| 3,608,994 | 9/1971 | McDonnel | 350/162 SF |
| 3,586,843 | 6/1971 | Sloane | 235/181 |
| 3,549,800 | 12/1970 | Baker | 350/161 |
| 3,409,872 | 11/1968 | Hogg et al. | 350/162 SF |

FOREIGN PATENTS OR APPLICATIONS

| | | | |
|---|---|---|---|
| 1,233,007 | 5/1971 | Great Britain | 235/181 |

*Primary Examiner*—Felix D. Gruber
*Attorney, Agent, or Firm*—Browdy and Neimark

[57] ABSTRACT

This invention comprises apparatus for optical processing of two dimensional convolution integrals of a signal function with a filter function. It makes use of specific adaptations of an optical processor not requiring input storage medium, denoted OPWISM. When the filter function is available as a two dimensional spatially varying optical filter, a specific category of OPWISM apparatus is utilized to produce the convolution integral. When the filter function is available as an electronic signal, the convolution integral can be produced from a specific combination of OPWISM apparatus.

11 Claims, 3 Drawing Figures

OPTICAL PROCESSOR FOR CONVOLUTION FILTERING

This patent application is a continuation in part of abandoned patent application Ser. number 157,445 entitled Optical Processor Not Requiring Input Storage Medium, filed June 28, 1971.

This invention relates generally to the optical processing of electrical signals obtained from measurement of two dimensional data arrays. More specifically it is concerned with the calculation of convolution integrals by optical processing in real time or near-real time. In particular this invention is concerned with optical electronic apparatus for performing such convolution calculations which are related to the principles disclosed in the above referenced patent application. This invention will specify particular apparatus and structures for evaluation of two dimensional convolution integrals by coherent optical processing without an input storage medium.

Among the two dimensional data arrays which can be processed by the apparatus of the present invention are the following:

1. The two dimensional back-reflection scan data of a coherent radar system, for example in synthetic aperture radar. The present invention provides apparatus for real time or near-real time processing of synthetic aperture radar data.

2. Two dimensional and optical scan data from a photograph or from other sensor instrumentation, for interpretation by means of mathematical pattern recognition based on the convolution integral. The present invention provides apparatus for economical real time or near-real time pattern recognition analysis of photographs, diagrams or two dimensional sensor instrumentation records in electrical or optical form.

3. Two dimensional photographic data for improvement by the methods of optical spatial filtering. The present invention provides apparatus for rapid and economical de-blurring of photographs, or for removal of other defects.

It should be realized that the convolution integral has wide-ranging significance as a two dimensional image which displays the reconstruction or the analysis of an information stream. It will be realized from these examples that the present invention is applicable to a wide range of information processing applications involving two dimensional optical or electronic functions. It provides an apparatus for rapidly and economically producing the convolution integral, which is a two dimensional image function. In particular it permits calculating this two dimensional image function in real time or near-real time, a process which cannot be done economically with presently available digital analogue or optical processing methods. The significance of the convolution integral as a two dimensional image, displaying the reconstruction or the analysis of an important information stream makes the present invention very useful in any situation where time value or computational economy must be considered.

One objective of the present invention is to calculate convoluintegrals as described below very rapidly and efficiently for purposes of display in a two dimensional data field. Another objective of the present invention is to perform such convolution calculations in real time, or almost real time i.e., to perform these calculations as rapidly or almost as rapidly as the data originates. Another objective of the present invention is to apply the convolution calculations to produce synthetic aperture radar displays in real time or almost real time. Another objective of the present invention is to perform pattern recognition calculations rapidly and efficiently by evaluation of convolution integrals. Another objective of the present invention is to perform filtering and processing of photographic data for removal of unwanted effects by filtering. Another objective of this invention is to perform autocorrelation or cross correlation of signal information rapidly and efficiently. It will be understood that a large range of applications exists in which convolution integrals are of key importance, and that rapid and efficient evaluation of such integrals will permit real time display of the two dimensional data field of the convolution integral. This display is characteristically in the form of a photograph or a cathode ray tube picture display.

Convolution integrals are particularly onerous to evaluate. If the integral $C(x, y)$ is expressed in the form to be described subsequently $$c(x,y) = \iint s(u,v) h(x-u, y-v) \, du dv$$

The computation problem may be described as follows. If each dimension $x$ and $y$ is to be evaluated at N points then $N^2$ values of $C(x,y)$ must be obtained. For each of these values the integrand must be evaluated at N values of $u$ and N values of $v$, thus a total of $N^2$ products must be summed for each value of $C(x,y)$. Thus a total of $N^2$ products must be summed for each value of $C(x,y)$. Thus a total of $N^4$ calculations is necessary if C is evaluated for all points $(x,y)$. If N is 1,000 this requires a total of $10^{12}$ multiplications. A very fast digital computer will require many hours to do this calculation. In practice such calculations are so expensive and slow that they are not performed for N values high enough to give a data field with good resolution, which can be displayed as a well resolved photograph.

From this description one can conclude that such convolution integrals cannot be evaluated with accuracy by conventional methods. However the present invention makes it possible to evaluate such integrals rapidly and efficiently in real time or almost real time. By this is meant that the calculation can be done almost as rapidly or as rapidly as the data is inputted.

Some important applications of this invention are the following:

In synthetic aperture radar a coherent radar back-reflected signal is obtained as an antenna is moved over a reflecting plane during a time period. The back reflected signal must be recorded and processed with a two dimensional filter function. The processed signal obtained by synthetic aperture radar can give a high resolution optical photograph. This process is described in the following references:

J.W. Goodman "Introduction to Fourier Optics" McGraw Hill (1968) Section 7.7 pages 184–198

W.M. Brown "Synthetic Aperture Radar" IEEE Transactions on Aerospace and Electronics Systems March 1967, pages 217–230

Brown and Porcello "An Introduction to Synthetic Aperture Radar" IEEE Spectrum, September 1969 page 52

L.J. Cutrona et al "On the Application of Coherent Optical Processing Techniques to Synthetic-Aperture Radar" Proceeding of the IEEE August 1966 pages 1026–1032

The signal processing required in synthetic aperture radar is the calculation of a convolution integral in which $s(x,y)$ is the coherent radar return when the antenna is at $(x,y)$ and the filter function is the product of the antenna pattern and the radar point reflection return function inverse as described in the references. The processed signal $C(x,y)$ gives the high resolution image of the radar reflection targets on the reflecting plane. It is expressed as $$C(x,y) = \int s(u,y) h(x-u,y) du$$

in which the simplest form of the filter function is $$h(x-u,y) = A(x-u/y) \exp - j\, 2\pi(x-u)^2/\lambda y$$

where $A$ is the antenna pattern function, and the next approximation is $$h(x-u,y) = A(x-u/y) \exp - j\, 4\pi/\lambda \ \sqrt{y^2 + (x-u)^2}$$

The processed signal $C(x,y)$ is usually displayed as a high resolution photograph after extensive processing. While such processing can be performed by analogue and digital methods, it is now usually performed by coherent optical processing, as described in the references. The coherent radar return is first recorded on a film, in the form of a large number of range scan returns which constitute a record of the entire radar reflection over the entire time period of observation. This film record is then optically processed using a specially prepared optical filter which is either a film transparency or a two dimensional lens. In either case the optical filter reproduces an approximation to the filter function $h(x-u,y)$ previously cited for synthetic aperture radar. The lens which reproduces the filter function is called a conical lens section.

While the optical processing for synthetic aperture radar described above, as elaborated in the references, produces a high resolution image of $C(x,y)$ it has several important disadvantages. It is necessary to record the entire radar return signal on film in order to perform the optical processing. This has two disadvantages:

1 The necessity for film recording of the radar return signal, which includes the disadvantages of film useage and of the development process for the film 2 The necessity for waiting till the entire radar return signal has been received before the optical processing can begin, since it is necessary to process the entire film image simultaneously in conventional optical processing. This optical processing requires a second film processing to take place.

It would be advantageous to have a real time viewing or display method for synthetic aperture radar, which would permit continuous viewing of the scene as it develops and as the radar return signal is received, with at most a very short time lag of a few seconds.

These attributes cannot be obtained with conventional coherent optical processing, which requires not only that the radar return signal shall be recorded on film, but also that the entire signal return over a time period which contributes to any $(x,y)$ position shall be available for simultaneous optical processing before the image including that point can be produced.

The present invention provides an optical processing method for synthetic aperture radar that permits real time display of the synthetic aperture radar image. The display can be produced as the scene develops, that is, as the successive radar reflection signals return. The present invention does not require any input storage medium, hence there is no time delay in recording the radar returns on film. The present invention performs an optical processing calculation for each radar return pulse as it is received. The present invention calculates each return pulse contribution simultaneously for all the viewing points of the image given by $C(x,y)$ to which it should mathematically contribute. This will be explained in detail below.

Another important application of this invention is in photographic interpretation and optical pattern recognition. This application area is described in the reference cited by Goodman, Section 7.6 pages 177–183. It is well known that such optical pattern recognition and photographic interpretation is based on the calculation of a convolution integral. The convolution integral in optical pattern recognition is called a cross-correlation function between a signal and a filter. The signal is the two dimensional signal function from a photograph for example. The filter is a two dimensional spatial filter function representing a spatial pattern for which the signal is being searched. Each of these two dimensional spatial functions may alternatively be represented as an electronic signal time series, as will be pointed out below. The filter electronic time series may consist of many two dimensional spatial patterns, each in time series form. The evaluation of the cross-correlation function of the signal with the filter thus represents a search among many optical patterns for those patterns which are present in the signal.

The present invention permits this cross correlation function, which is really a convolution integral, to be calculated rapidly and efficiently from electronic signal inputs. There is no necessity for recording the signal or filter data on film for coherent optical processing, hence the photographic interpretation and optical pattern recognition studies by means of the present invention can be performed in real time for immediate display of the convolution integral $C(x,y)$ as a two dimensional image.

Another area of application of the present invention is that of spatial filtering of photographs for improvement of photograph quality. This is discussed by Goodman in his referenced book pp 146–147. In this the signal function is the two dimensional spatial variation of the photograph, expressed in electronic time signal form. The filter function is the two dimensional spatial filter used for improvement of the photograph. In this application, as in the others discussed, the present invention permits rapid and efficient evaluation of the convolution integral, which in this case is the improved photograph image. The present invention permits this process to be carried out in real time or in near real time.

It will be realized from these examples that the present invention is applicable to a wide range of information processing applications involving two dimensional optical or electronic functions. It provides an apparatus for rapidly and economically calculating the convolution integral, which is a two dimensional image function. In particular it permits calculating this two dimensional image function in real time or near-real time, a process which cannot be done with presently available digital, analogue or optical processing methods. The significance of the convolution integral as a two dimensional image displaying the reconstruction or the analysis of an important information stream makes the present invention very useful in any situation where time value or computational economy must be considered.

Many data processing applications require the calculation of the convolution function $C(x,y)$ of two dimensional functions. Let $s(x,y)$ be a two dimensional function which will be termed the signal function. Let $h(x,y)$ be another two dimensional function which will be termed the filter function. Then the convolution function or convolution integral $C(x,y)$ of the signal function $s(x,y)$ with the filter function $h(x,y)$ will be defined as follows:

$$C(x,y) = \iint s(u,v) \, h(x-u, y-v) \, du \, dv \quad (1)$$

where the two dimensional integral extends over the entire $u$ and $v$ domains in which $s$ and $h$ are non-zero. A special case of this two dimensional convolution integral is the one dimensional convolution integral in which the $y$ variable does not appear $$C(x) = \int s(u) \, h(x-u) \, du \quad (2)$$

However, most applications are in the two dimensional domain where the signal function represents, for example, two dimensional photographic data, or two dimensional data on radar reflection from a plane.

It will be understood that a two dimensional convolution obtained from equation (1) may itself be interpreted as a two dimensional display Skolniks as Introduction photograph, since it is a function of two variables on a plane.

The terms signal function and filter function have specific technical meanings in information theory and in detection theory. Reference is made for example to Skilniks "introduction to Radar Systems" McGraw Hill (1962) where such terms are discussed, as well as to other standard works in these fields. However, for the purposes of this invention there is no significant distinction between these functions except their availability prior to a calculation.

The signal function is regarded as being unknown prior to the calculation, thus a wide generality of signal functions are contemplated in the present generation. The filter function, however is a definite known two dimensional function in many applications. In such applications it will be very useful to represent the filter function by an optical spatial filter. There will therefore be two forms of the present invention:

1 wherein the filter function is represented, as a component of the apparatus, by a two dimensional optical filter with spatially varying phase and opacity over its surface 2. wherein the filter function is represented as an electronic signal The present invention will input the signal function as an electronic signal which varies in time for either form of the invention. The filter function will also be inputted as such a time varying electronic signal in the second form of this invention. Thus the distinction between the two forms of the invention is not one of principle of operation, but rather the form in which the filter function is inputted.

It will be understood that a two dimensional function $s(x,y)$ or $f(x,y)$ can be converted into a time function $s(t)$ or $f(t)$, respectively, by establishing a correspondence between the time $t$ and the spatial point $(x,y)$.

The static signal function represented by a spatial array of intensity values $s(x,y)$, as stored on photographic film, for example, can be converted into an electronic signal $s(t)$ which varies with time $t$, by an optical scanning method as in a flying spot scanner or a vidicon tube. The electronic signal $s(t)$ thereby produced consists of a set of time sequences of signal data elements extending over a predetermined data frame time period. There will be a definite correspondence between the signal amplitude at any point $(x,y)$ and the signal data element value for the time point corresponding to $(x,y)$. This is given by the correspondence $$t = t(x,y)$$

that relates the time points in the signal function represented as an electronic signal with the two dimensional spatial point $(x,y)$. The correspondence $t = t(x,y)$ originates in the optical scanning apparatus. The electronic signal $s(t)$ will therefore consist, for example, of a set of time sequences of signal data elements, one for each row, in which the $x$ values vary while the $y$ value is held constant. It is apparent that alternatively one can set up time sequences for the column values. One can therefore divide the $(x,y)$ plane into a number of elemental spatial regions, e.g., the rows or the columns, each of which corresponds to a time sequence of signal data elements taken from the set of all time sequences of signal data elements which constitute the complete signal.

It is therefore apparent that when the filter function is represented by a two dimensional optical filter in the first form of this invention this optical filter will consist of a collection of elemental spatial regions in which each elemental spatial region of the filter corresponds to a time sequence of signal data elements.

It is also apparent that when the filter function is represented by an electronic time function $h(t)$ analogous to the representation described above for the signal function $s(t)$, in the second form of this invention, it will be convenient to use the same scanning method for both the signal function and the filter function. If this is done and the two functions $s(t)$ and $h(t)$ have the same time zero, then corresponding points in time will correspond to identical points $(x,y)$ in the data field for the two signals.

It should be pointed out that the equivalence of a time series with a spatial function which is obtained when a predetermined correspondence $t(x,y)$ is used, will permit the convolution integral $C(x,y)$ to be obtained as a time function $C(t)$ which can be converted to a two dimensional data field by use of the scanning correspondence relation $t(x,y)$.

The present invention uses apparatus related to the copending patent application for an optical processor without input storage medium, which will henceforth be referred to be its acronym OPWISM. The principles of OPWISM can be briefly reviewed as follows: OPWISM comprises apparatus for optical processing of time sequential data to produce a two-dimensional spatial classification pattern upon a detector surface. A spatial beam deflector or optical aperture selector is utilized in combination with an optical modulator, a holographic reference beam, an optical storage surface, and an optical system to produce a one or two dimensional spatial pattern analysis of the data.

More specifically the OPWISM apparatus may be described as consisting of a combination of six types of components:

1. An electro-optical modulator which converts an initially unmodulated phase coherent optical beam, e.g., from a laser, into a phase coherent modulated beam, by time sequential modulation of the beam in accordance with a time sequence of signal data which is the input to the OPWISM. The input sequence of signal data extends over a predetermined data frame time period. The modulation of the initial phase coherent beam is in any predetermined functional relationship with the amplitude of the signal data.

2 An optical beam splitter or other means for producing an optical reference beam from the initial phase coherent beam before its modulation takes place. Thus one produces an optical reference beam which is phase coherent with the coherent modulated beam which emerges from the optical modulator.

3 An optical detector surface which can store the individual optical signals incident upon it and perform time summation of these signals at each of its resolution elements. This optical detector surface can therefore be referred to as an optical storage surface. It may be considered an array of individual detector elements, where the individual elements represent the smallest resolution elements on the surface which have optical storage and time summation properties. An example of such an optical storage surface is an optical image tube surface with electronic readout, e.g., a vidicon tube with signal storage properties. Such tubes are available with storage times of a small fraction of a second to many minutes. They have a dynamic range of many tens of decibels, e.g., 30 or 40 dB permitting time summation of the stored signals. The minimum storage time required is that of the data frame time period of the input signal.

While it will be understood that such an optical image tube with electronic readout is the principal optical storage structure for OPWISM herein contemplated, in another form of OPWISM contemplated in the present invention a photographic film can be used as the optical storage surface.

4 A set of stationary mirrors positioned to superimpose the coherent reference beam upon the optical detector and storage surface. The modulated beam will also be deflected onto the optical storage surface, as pointed out below, hence the optical intensity on the optical detector storage surface will have terms proportional to the amplitude of the modulated beam, as in a hologram. This proportionality of the stored intensity to the signal amplitude is of key importance. Since the stored signal on the optical storage surface is proportional to the signal amplitude, and these stored signals are additive, each resolution element of the optical storage surface produces an algebraic sum, including phase, of the time series of signals incident on it.

5 A set of optical beam pattern generators to produce a spatial beam pattern sequence from the coherent modulated beam, through the optical system described below, upon the optical detector storage surface. Typically the optical beam pattern generator will be an optical beam deflector, i.e., a rotating mirror, an acoustooptic beam deflector, or an electro-optic beam deflector. However one can also utilize a spatial aperture selector of the moving reticle type. The optical beam deflector can be a rotating mirror, for example, with sufficiently large dimensions to minimize diffraction effects. The optical beam deflector will direct the modulated beam in two dimensions to a sequence of positions corresponding to a succession of directions for entry into the optical system, and through the optical system onto the optical detector storage surface.

It will be understood that the optical beam pattern generator will produce a spatial beam pattern sequence analogous to a distributed spatial source e.g., a photographic film transparency. The individual beams in the sequence will each be temporally modulated, since it is the modulated beam which is deflected or otherwise distributed by the spatial beam pattern generator. The effect is that of a spatially distributed source consisting of a number of coherent modulated beams. The fact that the individual beams are sequential in time instead of simultaneous in time does not affect the stored time summation of the signal values since the stored quantities are signal amplitudes which include phase and diffraction effects, in accordance with the holographic nature of the storage described under component 4 above.

Hence the effect of the optical beam pattern generator, in combination with the other elements of OPWISM, is to produce the effects of an input storage medium, i.e., a photographic transparency, without actual input storage.

It will be realized that the correlation of the beam deflection with the modulation of the beam is of essential importance. This correlation can be performed by adaptation of the beam deflection method, either in its mechanical design, in the case of mirrors, for example, or in the electrical drive signal patterns activating the beam deflector.

It will be understood that electrical drive signals or appropriate mechanical drives will be used to actuate and control the optical beam deflection pattern. Synchronization devices, either mechanical or electrical, will be used to synchronize the temporal modulation of the coherent optical beam with the beam deflection pattern generation, in accordance with the signal pattern spatial time sequence desired.

6 An optical system to perform optical processing of the beam pattern incident upon it, in accordance with the objectives of the apparatus. The optical system may consist of lenses, mirrors, filters, including spatial filters, apertures, and other devices used in optical analysis and processing. The technology of optical processing, particularly spatial fourier analysis and spatial filtering are well known, and are described for example, in Goodman's book, previously referred to.

An example of an optical system in OPWISM which will be used in the present invention is a two dimensional fourier spatial analysis system for a two dimensional signal input. The principals of spatial fourier processing by optical methods are well established. Spatial fourier analysis systems utilizing OPWISM are well defined in the co-pending patent application on OPWISM. Therefore an OPWISM optical processor for two dimensional fourier analysis in which an electronic readout of the resulting pattern is obtained can be considered a well defined element available for use in the present invention.

It should be pointed that electronic readout of the image produced on an optical image tube functioning as the optical detector storage surface provides an electronic signal output in time sequential form suitable for storage, display or subsequent optical or electronic processing.

It will be understood that the OPWISM may utilize spatial beam pattern generators which produce in their operation large variations in the optical path. In this case it may be necessary to merge the reference beam with the modulated beam in traversing the spatial beam pattern generator or beam deflectors in order that both beams may experience the same phase charge. This is called internal superposition of the beams before the optical storage surface. The OPWISM technology includes various optical path designs by which this can be accomplished. The important principle of such superposition is the necessity of separating the reference beam from the modulated beam before the optical section (6) in that the reference beam shall not traverse those sections of the apparatus that perform the optical analysis. Methods of merging and separating the two beams are specified in the OPWISM technology. One simple method is to traverse the reference beam through sections of the beam deflectors (or at angles with the beam deflectors) where they will not be incident on the optical analysis system of the apparatus.

The present invention in specifying apparatus for evaluation of two dimensional convolution integrals, extends the principles and structures of OPWISM in a number of directions in the various embodiments of the present invention.

1. A specific category of optical systems, comprising lenses, spatial filters and beam deflectors is specified for practicing the first form of the present invention, in which the two dimensional filter function of the convolution integral is utilized as a spatial optical filter within the apparatus.

2. The utilization of beam deflectors within the optical system is specified for optical processing in the first form of the present invention; this is an extension of OPWISM wherein the beam deflector is contemplated as external to the optical system, as a means of inputting an optical beam pattern to the optical system, and not as being within the optical system itself for the optical processing calculation.

3. The utilization of a specific category of optical systems for convolution integrals is specified including a specific category of spatial filters for synthetic aperture radar processing for real time display with high resolution of the developing scene scanned by the radar.

4. The utilization of a specific category of optical systems is specified for real time pattern recognition and image interpretation.

5. The utilization of combinations of OPWISM fourier analyzers with auxiliary modifications for evaluation of convolution integrals in the second form of this invention, in which the filter function is available as an electronic signal time sequence of data elements, and not as an optical spatial filter.

6. The utilization in an OPWISM fourier analyzer adapted for the second form of this invention of a series of optical modulators for multiplication of two time sequential data series.

7. The utilization in an OPWISM fourier analyzer adapted for the second form of this invention of an optical modulator for the reference beam, as means for multiplication of two time sequential data series.

Detailed specification of these new invention elements are given in the description below.

Before describing the structures of the various embodiments of this invention in detail it will be convenient towards a complete disclosure to define and explain a number of concepts which are of key importance for the present invention and whose prior explanation and description will facilitate the structural description of the invention.

An optical spatial filter is an optical transmitting device in which the optical transmittance or the optical phase change for an incident beam vary from one point to another over the surface of the filter. Both the optical transmittance and the phase change for a beam incident at any point may therefore be expressed as a two dimensional function $h(x,y)$ with reference to a coordinate frame $(x,y)$ on the surface. When $h^*x,y)$ describing an optical spatial filter is a complex function it can represent point to point variations in both the transmittance and the phase. It will be understood that when an optical spatial filter is used with a coherent optical beam the surface of the filter must not permit any erratic variations in optical path for, optical radiation passing through the filter. This means that the optical phase change must be carefully controlled at all points $x,y$ of the filter.

It is well known that optical spatial filters, i.e., filters with predetermined spatial variation in the local transmittivity and phase change, can be of key importance in coherent optical processing. Some examples of materials used as optical spatial filters are transparent photographic films with spatially varying opacity, transparent glass slides with varying opacity, glass lenses of selected spatial contours and opaque screens with a spatial pattern of slits. It is well known that when transparent films with optically rough surfaces are used as spatial filters in coherent processing, it is convenient to use a liquid gate immersion in a medium with the same dielectric constant as the film in order to remove random phase effects due to point-to-point optical path variations caused by surface roughness.

It will be understood that when an optical spatial filter is used to represent a time sequential filter function, it is convenient to divide the two dimensional surface of the optical spatial filter into spatial elements, each of which corresponds to one of the data elements of the time sequential filter function. This correspondence between the data elements of the time sequential filter function and the two dimensional spatial elements of the optical spatial filter will now be described.

It will be understood that both the filter function and the signal function can be regarded as either two dimensional spatial functions, or as time sequences of data elements, after the scanning processing described above has been performed. One can therefore make a one to one correspondence between a two dimensional spatial element on a two dimensional surface representing either function, and the data element in the time sequence representing the said two dimensional spatial element. The optical spatial filter is a two dimensional surface representing the filter function, hence one can make a correspondence between its spatial elements and the data elements of either the filter function or the signal function. The correspondence is made as follows: One indexes all points on the spatial filter surfaces by a two dimensional gridwork which is selected to produce the same number of cells or spatial elements as the number of signal data elements in the signal function, or in the time sequential filter function. The number of grids in the $x$ direction is equal to the number of signal scans in the $x$ direction, and the number of grids in the $y$ direction is equal to the number of resolvable signal data elements in each scan, i.e., the scan time resolution determines the spatial element dimensions in the filter function. This two dimensional gridwork indexes the optical spatial filter into a two dimensional grid of spatial elements, wherein each of said spatial elements of said optical filter can be put into a one-to-one correspondence with a data element of the time sequential scan of said two dimensional filter function. Since there is a one-to-one correspondence between the data elements of the time sequential form of the signal function and the time sequential form of the filter function, this also provides a correspondence with the signal function. This two dimensional gridwork therefore also indexes the optical spatial filter into a two dimensional grid of spatial elements, wherein each of said spatial elements of said optical filter can be put into a one-to-one correspondence with a signal data element of the time sequential signal scan of said two dimensional signal function.

The use of an optical spatial filter whose spatial elements are indexed to give a mapping or correspondence on a space point to time point basis with the signal data element sequence, permits one to utilize spatial operations on the beam passing through optical spatial filter in correspondence with the time modulation of said optical beam by the signal data element. In particular, this correspondence permits one to shift or displace the optical beam passing through the optical filter by the dimension of the image width of a filter spatial element, for each change in the signal data element entering the modulator. This permits simultaneous space and time modulation of a coherent optical beam, which is the basis for the optical convolution processing in the first form of this invention.

It will further be understood that in order to shape the optical beam to conform to a given area of the optical spatial filter, it must be made to conform in size to the specified region of the filter area. For example, in a one dimensional convolution in synthetic aperture radar, it is convenient to produce a "one-dimensional beam", whose width is one spatial element of the filter and whose length equals the side dimension of the filter. In a more general two dimensional convolution processing it is necessary to produce a "two dimensional beam" whose cross section conforms to the cross sectional area of the filter. The term optical beam conformer can be used for an instrument which produces an optical beam of desired cross section from an incident beam. The technology of optical beam conformers is well known. A telescope, for example can be used for expansion of the cross section of an optical beam in two dimensions, of if reversed, for contraction of an optical beam. Such beam expanders and beam contractors are readily available. A pair of one dimensional cylindrical lenses can be used for one dimensional beam expansion or contraction. In general a pair of lenses whose focal planes coincide can be used for spatially conforming an input beam to a desired output cross sectional area. An aperture in an opaque screen can then adjust the cross section of the expanded or contracted beam to any desired cross section shape. Such instruments will be termed optical beam conformers for matching geometrically or spatially conforming the input beam to a desired spatial area of the optical spatial filter.

It will be understood that a time modulated optical beam which passes through an optical spatial filter provides a spatially distributed optical function which is the product of the time modulation function $g(t)$ and the spatial function $h(x,y)$ of the filter area through which the beam has passed:

$$g(t)\ h(x-x_o, y-y_o)$$

where $(x_o, y_o)$ are the coordinates of the center of the filter area. It will be understood that the time point $t$ corresponds to a spatial point $(u,v)$ on the filter. It will therefore be understood that the optical product spatial function $$g(u,v)\ f(x-x_o, y-y_o)$$

can be made identical with the integrand of the convolution integral by moving the center of the filter, or the center of the filter image, to make $$x_o=u,\ y_o=v$$

It will be understood that what is important in this optical convolution is the spatial displacement of the optical image of this product spatial function on the optical storage surface. The following considerations must therefore be set forth:

1. The image of the optical spatial filter on the optical storage surface, and the image width of a spatial element of said filter.
2. Means for spatial displacement of said optical image on the optical detector storage surface.
3. Means for synchronization of this spatial displacement with variations in the time modulation of the optical beam.
4. The integration area of the optical storage surface and the utilization of a limited surface area for a sequence of images by retracement of the optical beam on the optical storage surface.

An optical system consisting on an appropriate lens or set of lenses can be used to image the extended spatial beam emenating from the filter onto the optical storage surface. This imaging will take place over the optical path including the beam deflectors, or other means for spatial displacement of the beam, onto the optical storage surface.

The means for spatial displacement of said optical image on the optical storage surface include moving mirror systems, piezoelectrically driven mirror systems, acousto-optic beam deflectors and various electrooptic beam deflectors and beam scanners. In general two dimension deflection or scanning of the image will be necessary. This can be accomplished with two image deflectors set at an angle to each other. Rotating mirror systems at an angle to each other constitute a well known technology for spatial displacement of optical images in two dimensions. It will be appreciated that a large variety of means for such spatial displacement or scanning of optical images can be utilized.

It will be understood that the spatial displacement required for each change of the signal data element in the modulator is that of the image width of a spatial element of the optical spatial filter. This image width of the filter spatial element on the optical storage surface can be either larger or smaller than the actual size of the filter spatial element. This criterion of displacement by a filter spatial element image width on the optical storage surface will hold for each dimension of the displacement. It will also be understood that the direction of the spatial displacement on the optical storage surface will depend upon the time sequential scan direction of the signal data element change inputted to the modulator. The spatial displacement of the filter beam image on the optical storage surface will be in the same direction as the time sequential scan direction corresponding to the signal data element change.

It will be appreciated that the spatial displacement of said optical image must be performed in synchronism with the change in signal data elements modulating the optical beam. Means for this synchronization of the spatial displacement of said optical image are well known. For example, the rotating mirror can be driven by stepping motors whose rotational steps will be electronically synchronized with the entrance of new signal data elements. Another method would simply require constant rotational speed or constant sweep speed of the optical displacement means, and a constant rate of signal element changes to the modulators. A large number of electronic methods for ensuring synchronization of two processes can be utilized.

It will be understood that the area of the optical detector storage surface is an image-sized integration area for the optical convolution product incident upon it. As the modulated filter image shifts in two dimensions on said surface the deflected image eventually leaves the image-sized integration area when the integration for that area has been completed. This must be read out electronically or otherwise before the integration area can be utilized for another integration. It is apparent that at least two such integration areas on adjacent optical storage surfaces are necessary if a continuum of images are to be processed and that the optical image must be deflected in appropriate sequence to each of the successive image sized integration areas on adjacent optical storage surfaces. This can be done with an appropriate deflection of a single beam of with two or more deflected beams whose position coordinates have the following predetermined relationship to one another: That the position coordinates of the centers of the modulated beam images on the respective optical detector surfaces for a given signal data element in the beam modulator shall be separated by at least half the width of the filter image in each spatial dimension corresponding to the time sequential scan of the two dimensional signal function, in each dimension of spatial displacement of the beam.

The various objectives of the present invention can be accomplished by means of various electronic and optical apparatus embodiments to be described, which can be diverse in nature but all of which operate according to common principles.

Figure 2:
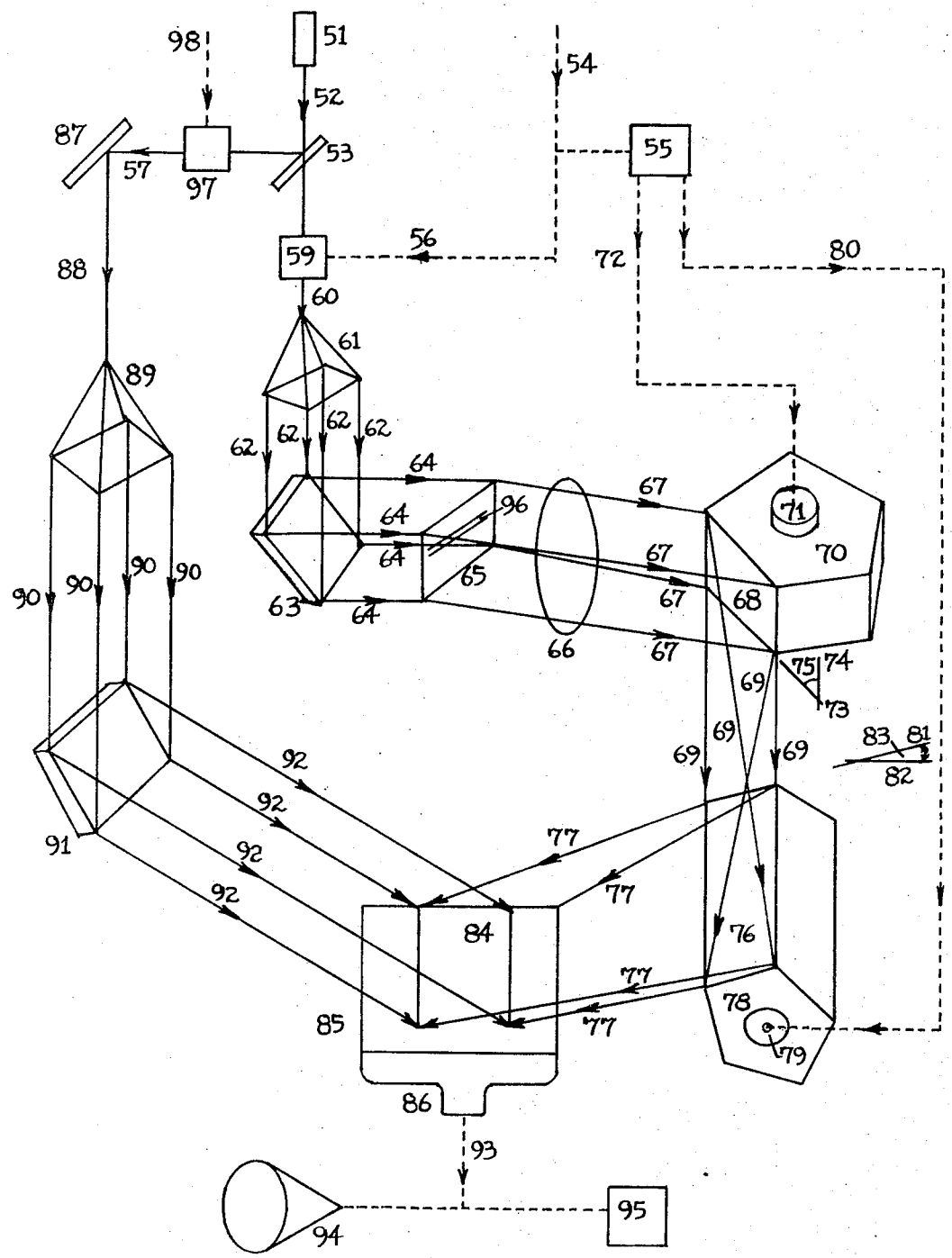
Figure 3:
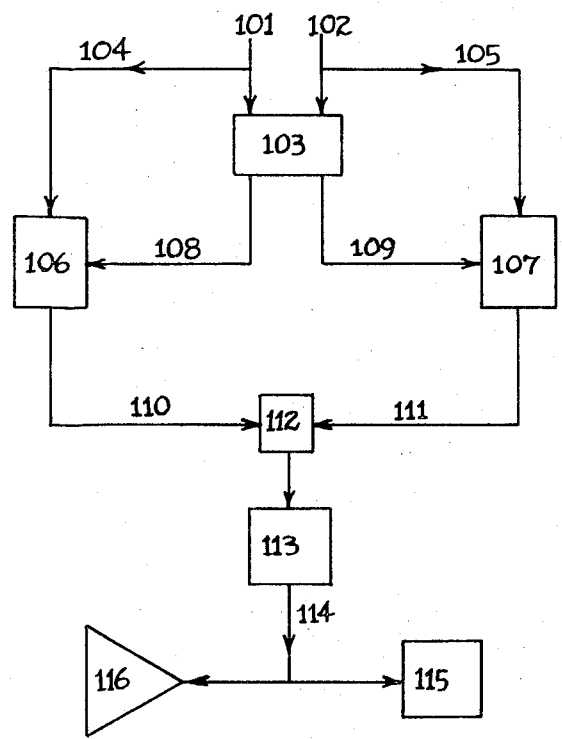

The basic principles by which the various embodiments of this invention are operative may be described with reference to the following figures: FIG. 1 shows the basic principles of this invention in an embodiment wherein the filter function is inputted as a two dimensional optical spatial filter, and the modulated beam is deflected sequentially in time through successive one-dimensional regions, e.g., rows or columns, of the two dimensional spatial filter. Such an embodiment is particularly useful for synthetic aperture radar in which the convolution integral, although a two dimensional function, is integrated over only one dimension of the filter. FIG. 2 shows the basic principles of this invention in an embodiment wherein the filter function is imputted as a two dimensional optical spatial filter and the modulated beam is transmitted through the entire spatial filter. Two dimensional beam deflection of the spatial filter image is utilized to perform the spatial integration. Such an embodiment is particularly useful for a two dimensional convolution integral requiring integration over two dimensions of the spatial filter. FIG. 3 shows the basic principles of this invention in an embodiment wherein the filter function is inputted as an electronic signal time sequence of data elements.

It will be appreciated that several alternative embodiments can be described with reference to each of these figures. For example, an embodiment similar to FIG. 1 in which the reference beam is deflected by the same optical beam deflectors as the modulated beam without passing through the optical spatial filter. Another embodiment similar to FIG. 1 will use two sets of beam deflection systems and optical storage surfaces, in which the beam deflectors are offset in angle form each other with reference to the viewing origin of the optical storage surface. Both types of alternative embodiments can also be utilized with reference to the system of FIG. 2.

Alternative embodiments similar to FIG. 3 will also be specified with reference to FIG. 3, in which the filter function or its fourier transform will be generated by an electronic function generator. Alternative embodiments will also be specified which utilize various methods of multiplying the fourier transforms of the signal function and the filter function.

With reference to FIG. 1 wherein the broken lines with arrowheads represent electrical signal flows and the simple unbroken lines with arrowheads represent optical beams, the components of this optical processing system are as follows: A laser or other coherent source denoted by 1 produces a coherent optical beam 2 which proceeds to beam splitter 3. Part of the optical beam 2 passes through 3 to become the input beam 8 into the optical modulator 9. The two dimensional signal function appearing in the convolution integral is inputted in signal channel 4 in the form of an electronic set of time sequences of data elements. This signal time function passes through the synchronizer, denoted by 5 and also proceeds through the signal channel denoted 6. It is applied to the optical modulator 9 where it time modulates the coherent optical beam 8. The modulated beam denoted by 10 enters a one dimensional beam expander denoted 11 from which there emerges an optical beam denoted 12 whose cross section has been significantly increased in one dimension. The cross section of beam 12 conforms to that of the spatial region denoted 19 which is described below.

Modulated beam 12 is reflected from mirror surface 13 of the optical beam scanner 14 which is shown schematically as a rotating multiply-faced mirror. The cross section of the modulated beam 12 is denoted on surface 13 as 42. The deflected modulated beam denoted 17 is incident on the spatial optical filter denoted 18 which is a two dimensional spatial mapping in terms of optical phase and opacity of the two dimensional filter function of the convolution integral. The optical spatial filter 18 can be divided into spatial regions denoted by 19, each of which corresponds to a set of data elements in the signal time function entering at channel 4 and impressed by modulator 9 on the temporal variation of the modulated beam. It should be noted that beam expander 11 geometrically conforms this beam to the dimensions of the spatial region 19 of the spatial filter.

The spatial region 19 may be considered a row or a column of the spatial filter 18. The optical beam scanner 14 causes the beam 17 to scan the spatial filter 18 row by row, or column by column, successively to cover the entire filter. The beam 17 covers the spatial region 19 of the spatial filter 18 during the time interval required for a single data element of the signal time sequence to modulate the beam. Each data element of this sequence modulates the beam 18 in succession as the beam 17 scans from one spatial region 19 to the next. The beam scanner or deflector 14 successively rotates till the beam 17 is positioned on the next adjacent spatial region (i.e., the next row) of the optical spatial filter 18. At this time the next data element of the signal time sequence controls the time modulation of coherent beam 8. Alternatively The movement of the optical scanner 14 takes place through a precision drive motor, e.g., a stepping motor, denoted 15, which is controlled by a synchronization signal on channel 16 from the synchronizer 5 which coordinates the position of the optical scanner 14 with the signal time sequence in channel 6 which operates the optical modulator 9. Alternatively many other types of beam deflectors may be used, e.g., mechanical or electro-optical scanners giving continuous sweeps. In such continuous beam scanners the synchronization can take place by the uniformity of the sweep speed.

The modulated optical beams 21 emerging from the optical spatial filter 18 are focussed by a lens system denoted 20 for producing a high resolution image denoted 30 of the spatial filter output on the optical storage surface 31. The lens system 20 for imaging the filter output 21 on the optical storage surface is designed for the image distance including reflected beams 21 and 29.

The modulated optical beam output 21 from the spatial filter is deflected by mirror surface 22 of the optical beam deflector, represented by a rotating mirror denoted as 24. The beam image on surface 22 is denoted by 23. The angle of surface 22 with a reference line denoted 27 is shown as angle 28. This angle will be called the scan angle in the description to follow. The rotating mirror beam deflector 24 is driven by a stepping motor 25 which is actuated by a signal denoted 26 from the synchronizer 5.

The optical beam from the filter deflected by the mirror surface 22 is denoted by beam 29. This beam produces an image denoted 30 on the optical storage surface 31 of the optical image tube 32 with electronic readout.

The coherent reference beam denoted 7 is reflected from stationary mirror 33 as beam 34. This beam is enlarged by beam expander 35 into a wider beam 36 which is reflected from mirror 37 as beam 38 which is superimposed on the optical storage surface 31. The coherence between reference beam 38 and the beam 29 from the spatial filter produces an optical intensity which is proportional to the amplitude, not the intensity, of beam 29, as is well known for holographic applications.

The image 30 of the time modulated coherent beam as spatially modulated by the optical spatial filter 18 and as shifted by beam deflector 24, is stored by surface 31 and algebraicly summed with the preceding similar images in the signal sequence. When the signal time data period is completed the image tube 32 can electronically read out the stored summation image and transmit it as an electronic signal sequence 39 for display in a storage oscilloscope 40 or for more permanent storage in memory unit 41.

As applied to synthetic aperture radar, for example, FIG. 1 shows an apparatus for evaluating the following convolution integral $$C(x, y) = \int_{x-N}^{x+N} S(u, y) h(x - u, y) du$$

Note that this two dimensional convolution integral $C(x,y)$ involves integration over only one dimension in $u$. $S(u,y)$ is the radar return signal from azimuthal value $u$ and range value $y$. For each $u$ value a sequence of values $S(u,y)$ are detected, one for each range value $y$. Thus a complete scan of the incoming signals over the $y$ values or rows of the filter is made for each $u$ value. The product of $S(u,y)$ and the filter function $h(x-u,y)$ is made between the integration limts $$|x-u| \leq N \text{ or } x-N \leq u \leq x+N$$

where $N$ is the maximum difference of $x$ and $u$ at which a signal can be detected.

Each $S(u,y)$ is deflected to cover a row of the filter $h(x-x_0,y)$ where $x_0$ is the center of the filter, where the row of the filter corresponds to the $y$ value.

The optical spatial filters used for synthetic aperture radar in the present invention, e.g., conical lens section filters and film transparencies of specific patterns, are described in the previously cited reference on synthetic aperture radar optical processing.

The apparatus described in FIG. 1 produces the signal corresponding to the image for $C(x,y)$, a two dimensional image display signal as follows:

As each signal value $S(u,y)$ is received, a one dimensional uniform image beam is produced, denoted by 42, which is proportional to the data element $S(u,y)$. This image beam is deflected to pass through the filter row corresponding to range value y, denoted by 19. In passing through the filter it emerges as the row spatial function $$S(u,y) h(x-x_0, y)$$

where $x_0$ is the coordinate of the center of the filter. This image beam is then reflected from the mirror surface which is turned at an angle to deflect the beam center $x_0$ at a position on the optical storage surface corresponding to $x_0=u$. Thus the beam deflector 24 shifts the image beam to make it $$S(u,y) h(x-u,y)$$

It should be pointed out that the beam deflector 24 must follow the modulation sequence by continually shifting the image beam coming through the filter to make $x_0=u$. The shifting of $S(u,y) h(x-u,y)$ on the optical storage surface therefore adds the appropriate contributions to the convolution integral at all points on the optical surface between $x_0-N$ and $x_0+N$ where $x_0=u$.

The coherent addition of all these terms on the optical storage surface makes the time summation equal to the convolution integral $$\int_{x-N}^{x+N} S(u, y) h(x - u, y) du = C(x, y)$$

This procedure can be summarized as follows: For each range $y$ one selects a strip of the spatial filter $(h(x-x_o,y))$ in which the $x$ values include the range or interval $$-N \leq x-x_o \leq N$$

A beam deflector shifts this strip on the optical storage surface in synchronism with the change in $u$ to make $x_o = u$. Thus the image beam is a strip on the optical storage surface with values $$S(u,y) \; h(x-u,y)$$

These values are added coherently, i.e., linearly and albegraicly to give the integral value.

Successive strips of the synthetic aperture radar integral are obtained by a. Expanding each $u$ strip through a one dimensional beam expander, and then traversing it through the appropriate filter row corresponding to the current range value $y$ b. Shifting the filter beam image by one step with each advance in the data element $u$ c. For each azimuthal value $u$ one deflects the beam successively through all range values $y$, that is, over all rows of the optical spatial filter d. The filter beam image shifts on the optical storage surface by the image width of one column of the filter when the azimuthal value $u$ increases by one resolution unit, and the range scan over the rows of the optical spatial filter begins again for this new $u$ value.

The center value of the filter image in the optical storage surface at any time is $$x_0 = u$$

For $x$ values such that $$u = x_o \geq x + N$$

The optical storage surface contains the completed integration over all values $$C(x, y) = \sum_{n=x-N}^{n=x+N} S(n, y) h(x - n, y)$$

Thus for $x_o = u \leq x + N$ the picture is not complete. But for $x_u = u \geq x + N$ it is complete. Note the continuous unfolding of the image on an infinite optical storage surface.

In practice one needs an optical storage surface of width at least $4N$ resolution elements since as one finishes up one optical storage surface of width $2N$ one is working developing data $2N$ resolution elements ahead.

If one has two optical storage surfaces each with $2N$ resolution elements this is sufficient. One reads off the finished images alternatively then the image signal can go to a storage oscilloscope, e.g., a Tektronix 611. One can obtain this action with two sets of optical storage surfaces with two beam deflectors in which the beam deflectors are set at least half an image width ($N$ resolution elements) apart so that one beam enters the new optical storage surface as the other enters the middle of the old one.

FIG. 2 shows the basic principles of this invention when the filter function is inputted as a two dimensional optical spatial filter and the modulated beam is transmitted through the entire spatial filter at all times. The basic principles of FIG. 2 will first be qualitatively described. Then the specific apparatus will be described. In this case the modulated beam image through the filter is deflected in two planes in synchronization with the modulation of data elements. The modulated beam image on the optical storage surface is shifted in both the x and y dimensions, corresponding to the evaluation of a two dimensional convolution integral of the form $$C(x,y) = \int\int S(u,v) \; h(x-u, y-v) du \; dv \quad (3)$$

Note that in equation (3) the integration is over two variables $u$ and $v$ unlike the integration in equation (1) which is only over one variable.

Note that unlike synthetic aperture radar where a $(u,v)$ value gives information only on a strip here a $(u,v)$ value gives information for the whole plane i.e., on contributions for all $(x,y)$ values.

In this situation one requires a beam expander to cover the entire optical spatial filter with the beam. The evaluation of the convolution integral will be based on the following expression:

$$C(x,y) = \int\int S(u,v) \; h(\epsilon,\eta) du \; dv$$

where $\epsilon$ is a region in $u$ of width $2N$ centered around $x$ $\eta$ is a region in $v$ of width $2N$ centered around $y$ This integral can be evaluated by means of position shifting mirrors or beam deflectors with limited apertures. This is a two dimensional analogue of the method previously described in FIG. 1. Consider a two dimensional mirror with dimensions $2N$ by $2N$ to conform with the filter, with appropriate geometric reduction for the imaging system. Let $x_o, y_o$ be the center of the mirror. The center of the mirror will follow $(u,v)$ $$x_o = u$$
$$y_o = v$$

The mirror will be shifted to satisfy this relation. One can use a single two dimensional mirror with its center shifted in both dimensions. Or one can use two deflectors, in one of which the $x_o$ center is shifted to follow $u$, in the other the $y_o$ center is shifted to follow $v$.

The $x_o$ mirror will be deflected to shift the image on the optical storage surface by one resolution unit in $x$ on this surface for each change in a $u$ data element. The $y_o$ mirror will be deflected to shift the image on the optical storage surface by one resolution element in $y$ on this surface for each change in a $v$ data element. Thus the deflection system acts as a masking function on the optical storage surface to place the image beam of the spatial filter on the desired portion of the optical storage surface.

This description of the deflection by one resolution element per each data element change in the modulator is applicable when the number of resolution elements on the optical storage surface is at least as great as the number in the filter. If the number of resolution elements is less than on the filter the deflection angle is $1/N$ th of the angular range per data element where $N$ is the number of resolution elements in the filter. The number of resolution elements in the filter governs the beam shifting. In short, the optical storage surface on which the entire image scene is generated is divided into a number of equal sized quasi-elements equal to the number of resolution elements in the filter. The deflection is into the next adjacent quasi-element for each change in the signal data element.

With respect to FIG. 2 wherein the broken lines with arrowheads represent electrical signal flows and the simple unbroken lines with arrowheads represent optical beams, the components of this optical processing system are as follows: A laser or other coherent source denoted by 51 produces a coherent optical beam 52 which proceeds to beam splitter 53. Part of the optical beam 52 passes through 53 to become the input beam 58 into the optical modulator 59. The two dimensional signal function appearing in the convolution integral is inputted in signal channel 54 in the form of an electronic set of time sequences of data elements. Thus signal time function passes through the synchronizer, denoted 55 and also proceeds through the signal channel denoted 56. It is applied to the optical modulator 59 where it time modulates the coherent optical beam 58. The modulated beam denoted by 60 enters a two dimensional beam expander 61 from which there emerges an optical beam denoted 62 whose cross section conforms to that of the optical filter denoted 65.

Modulated beam 62 is reflected from the mirror surface 63 and the and the reflected beam 64 passes through the two dimensional spatial filter 65 which is a two dimensional spatial mapping in terms of optical phase and opacity of the two dimensional filter function of the convolution integral. A typical elemental spatial region denoted by 96 of said spatial filter 65 corresponds to a typical sequence of data elements in the filter function represented as a time series, and in the signal function as a time series input. The modulated optical beam 67 emerging from the spatial filter 65 are imaged by a lens system denoted 66 for producing a high resolution image denoted 84 of the spatial filter output on the optical storage surface 85. The lens system 66 for imaging the filter output 67 on the optical storage surface is designed for the image distance including reflected beams 69 and 77.

The modulated optical beam output 67 emerging from said spatial filter is deflected by mirror surface 68 of a first one-dimensional optical beam deflector, denoted 70, and these deflected beams 69 are then deflected by mirror surface 76 of a second one-dimensional beam deflector, denoted 78, where the two one-dimensional beam deflectors are positioned to deflect on orthogonal coordinates on the optical storage surface 85. The movement of optical beam deflectors 70 and 78 each take place by means of a precision drive motor, e.g., a stepping motor, denoted 71 and 78 respectively, which are controlled respectively by synchronization signals on channel 72 and 80 from the synchronizer 55 which coordinates the position of the beam deflectors with the signal time sequence on channel 56 which controls the optical modulator 59.

Beam deflector 70 is synchronized with the set of time sequences of data elements in the signal function time series as follows: For each new data element within a specific sequence, (where said specific sequence corresponds to a row of spatial filter, for example) introduced to the modulator, the first beam deflector steps to the next adjacent resolution element on the optical storage surface on its deflection dimension. These resolution elements are defined by the optical system 66 which focusses the filtered beam image on the optical storage surface as image 84. The minimum size of the resolution element is determined by the structure of the optical image tube 88; thus the actual resolution element spacing in each dimension on surface 85 will be the larger of the two resolution spacings, that determined by the optical system and that determined by the optical image tube structure.

Beam deflector 78 is synchronized with the set of time sequences of data elements in the signal function time series as follows: For each new specific sequence, (e.g., corresponding to a row of the spatial filter) introduced to the modulator, the second beam deflector steps to the next adjacent resolution element in its deflection dimension on the optical storage surface. Thus the first beam deflector steps to the next adjacent resolution on the optical storage surface on its deflection dimension, for each new data element within a sequence, introduced to the modulator (corresponding to the column elements within a row of a two dimensional spatial function). The second beam deflector on the other hand steps to the next adjacent resolution element on the optical storage surface in its deflection dimension (which is orthogoral to that of the first beam deflector) for each new sequence of data elements, (e.g., for each new row of a two dimensional spatial function). In this way these two beam deflectors synchronize with the input signal to shift the modulated beam bearing the filter image in accordance with the summation requirements for evaluation of the convolution integral.

The successive modulated filter images are focussed as image 84 on the optical storage surface, from beams 77. A reference beam 92 is slso incident on the optical storage surface to produce, in combination with image 84 from beams 77, a holographic image whose intensity at each point of 84 is proportional to the amplitude and phase of the signal at said point from beams 77. This amplitude-proportional intensity is sensed by surface 85 and stored until the electronic beam readout of the entire image extending over the frame time of the signal. The storage and summation of the successive shifted images is performed by the optical storage surface, and the temporal and spatial summation is read out as an electronic signal on channel 93 by electronic beam readout from surface 85. This readout can then be displayed on an oscilloscope 94 or stored in a storage medium 95. The reference beam 92 over the optical storage surface is produced as follows. The reference beam 57 from the beam splitter 53 is reflected from mirror 87 as beam 88. This beam then passes through a two dimensional beam expander 89 which produces an expanded beam 90 which is reflected from mirror 91 to produce beam 92.

An optical phase modulator denoted by 97 is placed in the optical path of the reference beam 57. This phase modulator for the reference beam can be controlled by an electrical signal denoted 98. Phase modulator 97 is used to change the phase of the reference beam by a constant amount, e.g., by 90°, with respect to the modulated beam 58, in order to select the real or imaginary parts of the convolution integral. This procedure will be described below. Phase modulator 97 is also used when one wishes to modulate the reference beam by electronic means 98 in order to obtain a product function by electronic means alone. This procedure will be described below in connection with FIG. 3.

It will be understood that the spatial displacement in the two dimensional convolution is identical in concept to that in the one dimensional case, but is applied to both dimensions of the image on the optical storage surface. A means for spatial displacement of said image is provided which is adapted to shift the image on said two dimensional optical detector and storage surface in each dimension by the image width of one filter spatial element for each signal data element change inputted to the modulator, corresponding to said time sequential scan of the signal function in that dimension.

Although the mirror 91 is shown as a stationary mirror in FIG. 2 it will be understood that the reference beam path can include mirror surfaces which are parts of the structures 70 and 78 acting as first beam deflector and second beam deflector. In this case such mirror surfaces take the place of mirror 91 in deflecting the reference beam to the optical storage surface. In this way by utilizing the same rigid physical structure for deflecting both the modulated beams 77 and the reference beams 92, any phase variations introduced into the modulated beam by the first and second beam deflectors are also introduced into the reference beam, thus maintaining a high degree of phase coherence in the two beams.

It will be understood that the signal function may consist of a large number of individual scenes, where a scene is defined as a section of the signal function having the same number of resolution elements (the same total number of data elements) as the filter function. The same filter function will apply to each of these scenes, since the filter function appearing in a convolution integral depends only on the displacement of points i.e., on $x-u$ and $y-v$, not on the absolute values. It will be understood that preferentially, the number of resolution elements in the filter (which is equal to the number of data elements in a signal function scene) should be transferred to the optical storage surface to generate a scene. However, even if the optical storage surface has fewer resolution elements than the filter, one can obtain a processed image on it with poorer resolution of the number of signal data elements equal to the number of filter resolution points is transferred. A transfer of the set of data elements necessary for a scene on the optical storage surface is necessary for a complete scene processing.

An example of a signal function that consists of a large number of individual scenes is synthetic aperture radar. Here every position of the aircraft records a new scene. One has a continuum of unfolding scenes as the signal. The same filter function applies to every scene.

If the signal function consists of a large number of individual scenes one would require a very long optical storage surface or a large number of individual optical storage surfaces, on which to integrate the convolution integral. This very long optical storage surface can be avoided by the following method which requires only two optical storage surfaces to record successive scenes alternately in a continuous fashion.

Referring again to FIG. 2 note that the extension of reflecting surface 68 in line 73 makes an angle denoted 75 with a reference direction 74. This is termed the scanning angle of the first beam deflector. Similarly, the extension of reflecting surface 76 makes an angle denoted 83 with a reference direction 82. This is termed the scanning angle of the second beam deflector. In the operation of each beam deflector the scanning angle has a maximum anplitude $2\Delta\theta$ for the first beam delfector and $2\Delta\phi$ for the second beam deflector. That is the range of angular variation is $2\Delta\theta$ and $2\Delta\phi$ respectively. If one now has a second apparatus, identical with the one described, composed of modulator, filter, beam deflectors and optical image tube, in which the signal beam deflectors are advanced respectively, by an angle of $\Delta\theta$ in the first beam deflector and $\Delta\phi$ in the second beam deflector, then the two apparatuses together will successively include the entire scene viewed on their optical storage surface. As one section of the scene is being completed on the first apparatus optical storage surface, the next adjacent section is being formed by summation on the second apparatus, and vice versa. The two apparatuses will each integrate and develop successive scene sections, thus making unnecessary an infinite optical storage surface.

It will be understood that although the optical beam deflectors shown in FIG. 2 are depicted as rotating mirror scanning systems a variety of different beam deflectors can be utilized. For example acoustooptical deflectors, electro-optical deflectors, mechanical or electrical vibrating mirrors and reticles, and other types of optical beam deflectors can be utilized. The technology of such beam deflectors is well known.

With reference to FIG. 3 which shows a schematic block diagram of the second form of this invention wherein the filter function is inputted as an electronic signal time sequence of data elements, the invention may be described as follows: The signal function is inputted on a channel denoted 101 into the synchronizer denoted 103. The signal function is also inputted on a channel denoted 104 into an OPWISM apparatus denoted 106, adapted for producing the two dimensional Fourier transform of the signal function. The filter function is inputted on a channel denoted 102 into synchronizer 103. The filter function is also inputted on a channel denoted 105 into an OPWISM apparatus denoted 107, adapted for producing the two dimensional Fourier transform of the filter function. The OPWISM apparatuses 106 and 107 produce their respective Fourier transform outputs as electronic signal time sequences in synchronism, as controlled by timing signals from synchronizer 103 in channel 108 to OPWISM apparatus 106 and in channel 109 to OPWISM aparatus 107. The Fourier transform of the signal function is therefore outputted in channel 110 in synchronism with the fourier transform output of the filter function in channel 111. These Fourier transform outputs are inputted in synchronism, data element by data element into a multiplying element designated 112 which produces the product of the transforms as an electronic time sequence. The Fourier transform product is inputted into OPWISM apparatus 113, adapted for producing the inverse Fourier transform of its input, which is the convolution integral in time sequence form. The resulting convolution integral image function is outputted on channel 114 to a storage device 115 or to a direct CRT display device 116.

One can show that the product of the fourier transforms of the signal function and the filter function is the fourier transform of the convolution integral from the convolution theorem of fourier analysis. This theorem is described in standard references, e.g., Goodman op. cit. Since the resulting product is a Fourier transform, the Fourier inverse operation performed in OPWISM apparatus 113, whose optical system is selected to perform the Fourier inversion operation, produces the convolution integral directly.

It will be understood that it is not necessary to produce the fourier transform of the filter function in an OPWISM apparatus 107, if the filter function is known beforehand. In this case the Fourier transform of the filter function can be prestored and regenerated by an electronic function generator, in synchronization with the signal function fourier transform, as described above.

It will also be understood that the multiplication element 112 may be an integral part of the OPWISM apparatus for the inversion of the product of the Fourier transforms. This may be accomplished in two ways. One method will use two optical modulators in series in the OPWISM apparatus. The second method will apply modulation to the reference beam as well as to the signal.

The apparatus for multiplication of the signals in the OPWISM apparatus by means of two optical modulators in series can be described as follows: FIG. 1 and FIG. 2 each show a coherent optical source, e.g., a laser, whose output beam passes through a single optical modulator to which the signal function is applied as an electronic time sequence of data elements. The electronic data elements of the signal function control the amplitude of the coherent optical beam traversing the modulator and in this way the beam is modulated. One can set another optical modulator at the input or output side of the first modulator, and aligned with the optical beam in order to avoid changing the direction of the beam. If another electronic time sequence is applied to the second modulator, it too will modulate the coherent optical beam, in accordance with its sequence of data elements. The beam emerging from the two aligned optical modulators will have been independently modulated by the two signals. It will therefore be proportional to the product of the two independent electronic time sequences. In the present application, one time sequence coming from channel 110 will be the Fourier transform of the signal function, produced by OPWISM apparstus 106. The other time sequence coming from channel 111 will be the Fourier transform of the filter function. The two electronic time sequences will be in synchronization with each other because of the action of the synchronizer 103.

Synchronizer 103 acts during the electronic signal readout from the optical image tubes of the two OPWISM apparatuses 106 and 107, to synchronize the sweeps of the electronic readout beam across the tubes. This will cause portions of the output signal coming from the same spatial regions of each tube to be read out at the same instant and to be multiplied together in 112. The technology of such synchronization is well known. If an electronic function generator is used to produce the fourier transform of the filter function, the synchronizer can similarly correlate the outputs of the two transforms to cause portions of the output signal corresponding to the same region coordinates of the Fourier transform plane to be read out at the same instant and to be multiplied together.

The apparatus for multiplication of the signals in the OPWISM apparatus by means of modulation of the reference beam simultaneously with the modulation of the principal modulated beam, which passes through the optical system, can be described as follows: FIG. 1 and FIG. 2 each show the principal beam which is not diverted by the beam splitter and which then passes through the optical modulator and the optical analysis system of the apparatus. These figures each also show a reference beam which is reflected by the beam splitter to prevent its passage through the optical analysis system. FIG. 2 also shows an optical phase modulator denoted 97 in the path of this reference beam. One can apply an electronic time sequence of data elements denoted 98 to phase modulator 97 of this reference beam. The reference beam will then be optically modulated by the electronic time sequence data elements. The coherence of the reference beam with the principal modulated beam will not be affected by this modulation. The intensity of the image on the optical storage surface will be proportional to $$|F_1(t) + F_2(t)|^2$$

where $F_1(t)$ is the modulation of the principal beam and $F_2(t)$ is the modulation of the reference beam. It is apparent that the intensity will contain two terms of the form $$F_1(t) F_2^*(t) + F_2(t) F_1^*(t)$$

This term is the real part of the product of the two modulation functions. Thus the modulation of the reference beam leads to the multiplication of the signal and the filter functions.

The two additional terms in the intensity are $|F_1(t)|^2 + |F_2(t)|^2$. The information content in these terms can be suppressed, by selecting the dynamic range of the optical image tube to give only signals in excess of these additional terms. This technology of utilization of the dynamic range of a photographic film or of an optical image tube for selective suppression of information is well known in holographic and photographic technology.

It will be advantageous for the full disclosure of the present invention to explain certain of the principles and the technology of this invention with greater completeness and detail. For this reason, a number of topics previously referred to will be discussed in greater detail.

It will be understood that the various forms of this invention described for producing an image signal of the convolution integral $C(x,y)$ produce only the real part of this integral. In general a convolution integral will be a complex number with a real part and an imaginary part, since the input signal and filter function have both amplitude and phase values, and are therefore complex functions. The nature of the calculation performed in this invention is such that one obtains $$A^*C(x,y) + AC^*(x,y)$$

where the asterisk denoted the complex conjugate and A is the reference beam. If the reference beam has no phase value it may be taken as unity and one then has $$C(x,y) + C^*(x,y)$$

which is twice the real part of the convolution integral.

For many applications the real part A* the convolution integral gives sufficient information for a processed image. However it should be pointed out that one can obtain the imaginary part of $C(x,y)$ by displacing the phase of the reference signal by 90°. This can be done with an adjustable phase modulator, e.g., an electro-optic phase modulator, in the optical path of the reference beam. This adjustable phase modulator is denoted by 97 in FIG. 2. In this case $A = -A$ and one therefore produces $$C^*(x,y) - C(x,y)$$

which is twice the imaginary part of the convolution integral. Thus by evaluating the convolution integral twice, with two reference beams phased 90° apart, one obtains both the real and imaginary parts of the integral.

This double calculation can also be done by using coherent beams of two opposite polarizations. For each polarization one can have a different relative phase angle between the reference beam and the modulated beam.

It will be understood that although the signal function and the filter function usually have specific geometric significance, one can evaluate the convolution integral using arbitrary functions of space or time for either of these functions. Thus any time function can be interpreted as a two dimensional spatial function for the signal or for the filter. Therefore the second form of the present invention can be utilized to calculate the convolution integral for arbitrary input functions. When the same function is used for the signal and the filter function, the convolution integral is called an autocorrelation function. When different signal functions are used the convolution integral is termed a cross-correlation function.

The requirement in such a calculation is that there shall be a well-defined correspondence between the data elements of the filter function and the signal function, i.e., that there shall be a defined time origin for each electronic time sequence of data elements.

In the first form of the present invention wherein the filter function is represented by a two dimensional optical spatial filter, the individual data elements of the filter function, which are the optical resolution elements of the spatial filter, determine the deflection of the modulated optical beam passing through the filter onto the optical storage surface. The manner in which this beam deflection depends on the spatial filter function resolution elements is as folows: As each signal data element sets the optical amplitude by means of the modulator, the center of the beam deflector must be directed at a corresponding angular resolution element on the optical storage surface. The two dimensions of the optical storage surface are each divided into spatial elements corresponding to the resolution element of the spatial filter. These spatial elements will actually be resolution elements of the optical storage surface, if this surface has sufficient resolution to correspond to the filter. If not it will produce a processed image with poorer resolution than that of the inputs.

The condition for the integration, however, does not depend on the resolution of the optical storage surface. It does require, however, that the center of the beam deflector must be directed at the spatial element on the optical storage surface corresponding to the resolution element of the filter whose corresponding data element is in the modulator.

This correspondence may be described in greater detail as follows: To each signal data element there corresponds a spatial resolution element of the optical spatial filter. For each such spatial element of the filter there corresponds a spatial region on the optical storage surface, and for each of these spatial regions there is a beam deflection direction that will direct the center of the modulated spatial beam emerging from the filter towards it. The condition for correct integration on the optical storage surface is then as follows: As each signal data element controls the modulator, the modulated beam emerging from the filter must have its center directed towards the spatial region in the optical storage surface corresponding to said signal data element, using the correspondince of the filter spatial resolution element to match the signal data element with the spatial region of the optical storage surface.

The first form of the present invention wherein the filter function is represented as an optical spatial filter makes use of the principle of deflecting a broadened modulated beam transmitted through the optical spatial filter. This principle is applied in each dimension in which a convolution integration is performed. For synthetic aperture radar in which only a one dimensional convolution integration is performed, although the image also depends on the other dimension, the convolution integral reads $$C(x, y) = \int_{x-N}^{x+N} S(u, y) f(x - u, y)\, du$$

where the number of data elements in the filter function extends in the $x$ dimension from $x+N$ to $x-N$, a total of $2N$ data elements or resolution elements.

For a two dimensional convolution integration the integral takes the form $$C(x, y) = \int_{x-N_1}^{x+N_1} du \int_{y-N_2}^{y+N_2} dv\, S(u, v) f(x - u, y - v)$$

In each direction of convolution integration the principle is as follows:

1 The modulated optical beam containing the current signal data elements $S(u,v)$ is expanded to cover the filter sections corresponding to the convolution integration. In synthetic aperture radar this filter section is the particular row, $y$, of the filter, corresponding to the range data element value $y$ of $S(u,y)$. Thus all column values $u$ of the filter for the given $y$ row are covered. In a two dimensional integration the entire filter surface is covered by the beams corresponding to the two dimensional convolution integration. 2. The modulated expanded beam passing through the flter which can now be represented as $$S(u,v)\, f(x-x_0, y-y_0)$$

in the second case where $(x_0,y_0)$ is the center of the beam and as $$S(u,y)\, f(x-x_0,y)$$

in the synthetic aperture radar case, is deflected in such a way that the center of the beam is directed at a resolution element on the optical storage surface corresponding to the data element $u,v$ currently in the modulator. Hence $$x_0 = u,\ y_0 = v$$

This requires that the optical storage surface shall be categorized according to the data elements, $u$, $v$ or of the resolution elements of the filter, of which there are $2N_1$ in the $u$ dimension and $2N_2$ in the $v$ dimension. The beam deflection shall be performed according to this categorization of the data elements in the optical storage surface.

It is therefore apparent that the modulated expanded beam image of the filter, deflected on the optical storage surface, has the functional dependence $$S(u,v) f(x-v, y-v)$$

The stored time summation of these individual deflected modulated beam images gives the convolution integral described above.

It is apparent that an imaging lens system is desireable in conjunction with the beam deflectors to produce a well resolved image on the optical storage surface. It is apparent that if the number of resolution elements on the optical storage surface is greater than or equal to the resolution of $2N_1$ by $2N_2$ of the filter beam, that the convolution integral can have the resolution of the signal and filter. If it has fewer resolution elements, it will not have this degree of resolution, even though the number of individual beam center deflection elements is equal to $2N_1$ by $2N_2$.

It is apparent that the optical system and the beam deflection rate will be selected to match the beam center scan rate over the spatial elements of the optical storage surface with the input rate of signal data elements, corresponding to the filter resolution elements, into the optical modulator.

The beam deflection rate can be designed quantitatively as follows:

Let $n$ be the ordinal number of the data element going into the modulator in serial sequence, which can also be taken as the ordinal number of the filter resolution element. Let $y$ be the position in one dimension on the optical storage surface. Let any spatial element in the $y$ dimension on this surface have a width $Ly/2N_1 = \Delta y$. Then the condition for beam deflection is $$dn/dt = (1/\Delta y)(dy/dt)$$

where $dy/dt$ is the deflection rate of the beam in the $y$ dimension. This says that the data element entry rate into the modulator equals the rate of deflection over the spatial elements $\Delta y$ on the optical storage surface. One can express $dy/dt$ in terms of the distance of the optical storage. Surface $r$, from the beam deflector, and of the angular velocity of the beam deflector $d\theta/dt$ $dy/dt = r\, d\theta/dt$ Substituting into the above equation one finds $$d\theta/dt = (\Delta y/r)(dn/dt)$$

Some typical values are as follows: If the optical storage surface dimension for the scene is 50 cm, and if $2N_1 = 5,000$ elements, one has $\Delta y = 10^{-2}$ cm. For a 10 cm radius one finds that a data rate of $10^4$ elements per second requires an angular deflection speed of 10 radians/sec or 90 resolutions per minute. A reasonable angular deflection speed of $10^3$ to $10^4$ rpm will lead to a data rate of $10^5$ to $10^6$ elements per sec for a 10 cm radius, or to $10^6$ to $10^7$ elements per sec for a 100 cm radius. An electronic beam deflector e.g., acoustooptic, can produce a $d\theta/dt$ corresponding to $10^6$ radians per sec, corresponding to $10^9$ data elements per sec for a 10 cm radius.

This points up one of the unusual advantages of this invention. Attainment of very high time-bandwidth products representing a processing rate corresponding to a large number of resolution elements at high speed. This invention permits the calculation or numerical processing of the high data levels corresponding to photographic information in real time and with the high resolution corresponding to the characteristics of photographic information channels. Furthermore this high time-bandwidth data processing can be obtained in an economical fashion with a compact apparatus.

It will be understood that the time summation of beam image data stored on the optical storage surface at any time will include points for which the integration has been completed as well as points for which it has not yet been completed. Consider the one dimensional convolution integral for example, where U is the current beam deflection.

$$C(x, y) = \sum_{u=x-N}^{U} S(u, y) f(x - u, y)$$

when the Uth data element has been processed. It will be recalled that the beam center $x_o = U$ at any time. For points x such that $$U \geq x + N$$

the integration has been completed and no additional contributions are being made at these points. For points x such that $$U \leq x + N$$

the picture has not yet been completed. When all the points on an optical storage surface have been completed an electronic readout of the stored and summed data of the completed image can be made.

It will be understood that said optical storage surface has a limited dynamic range of signal detection capabilities. For example the optical detector surface of an optical image tube usually has a dynamic range of no more than 30 to 40 DB. It is convenient to operate it in its time storage proportionality range and the electronic readout is performed at the completion of each data frame time period to permit a new cycle of storage intensity. It will therefore be understood that the time and intensity for each exposure of said shifted modulated beam image on said optical recording surface are selected to prevent exhaustion of the dynamic range.

It will be understood that each image signal is confined to a specified data frame time period with a limited total of signal data elements. It is convenient to limit each data element contribution in its energy deposition per unit area to less than 1/T of the dynamic range available, in order to prevent exhaustion of the dynamics range. Here T is the total number of data elements contributions to the signal for any given image. This limitation can be made in an obvious manner by selecting the time and intensity for each exposure of said shifted modulated beam images on the optical storage surface, since the product of exposure time and beam intensity per unit area gives the energy deposition per unit area. Thus if $= Pt = \gamma D$ then $D \leq R/T$, where R is the total dynamic range.

While the description of the optical processor for convolution filtering and structural embodiments relating to it have been set forth above, it will be appreciated that other obvious variations can be made in carrying out the invention disclosed herein. Accordingly, such variations falling within the purview of this invention may be made without in any way departing from the spirit of the invention or sacrificing any of the attendant advantages thereof, providing however that such changes fall within the scope of the claims appended hereto.

What is claimed is:

1. An optical processing apparatus for producing a processed image signal proportional to the two dimensional convolution integral of a two dimensional signal function with a specified two dimensional filter function, wherein said two dimensional signal function is inputted as a time sequence of signal data elements extending over a predetermined data frame time period corresponding to a time sequential scan of said two dimensional signal function, and said specified filter function is inputted as an optical spatial filter, comprising in combination 1 means for time sequential modulation by said signal function of at least one phase coherent beam to produce at least one phase coherent modulated beam 2 means for producing at least one optical reference beam phase coherent with said modulated beam 3 at least one optical detector storage surface, comprising a two dimensional array of individual detector storage elements 4 means for superimposing said coherent reference beam upon said optical detector storage surface 5 at least one optical spatial filter with two dimensional spatial variation in optical transmittance and optical phase change, corresponding on a spatial point by point basis to said specified filter function, wherein said spatial variation may be indexed by a two dimensional grid of spatial elements, wherein each said spatial element of said optical filter can be put into a one-to-one correspondence with a signal data element of the time sequential signal scan of said two dimensional signal function 6 at least one optical beam conformer adapted to spatially conform said phase coherent modulated beam to at least one specified set of spatial elements of said filter, thus producing a modulated beam image emerging from said filter, whose time and spatial amplitude variation is proportional to the product of said modulated beam and the spatial variation of optical transmittance and phase of said specified set of spatial elements of said filter 7 means for optical imaging of said modulated beam image emerging from said optical filter onto said optical detector storage surface 8 means for spatial displacement of said modulated beam image 9. at least one electronic synchronizer whose output signals produce a time synchronization between said time sequential modulation and between spatial displacement of the optical image produced by said optical spatial filter wherein said synchronizer regulates said means for spatial displacement to shift said image on said two dimensional optical detector surface in each dimension by the image width of one filter spatial element for each signal data element change, corresponding to said time sequential scan of the signal function in that dimension, inputted to the modulator, and wherein said optical detector surface performs storage and time summation for at least one data frame time period, of said modulated beam images incident on it, wherein the stored time summation on said optical detector surface of said spatially displaced modulated beam images incident on said surface over one data frame time period, constitutes said processed image signal proportional to said two dimensional convolution integral.

2. An optical processing apparatus as defined in claim 1 wherein said optical detector storage surface is on an optical image tube with electronic signal readout of said processed image signal.

3. An optical processing apparatus as defined in claim 2 wherein said means of spatial displacement of said modulated beam image upon said optical detector surface, returns said modulated beam image to an initial position upon said surface corresponding to the initiation of the calculation, at the completion of each said data frame time period.

4. An optical processing apparatus as defined in claim 1 wherein said means for spatial displacement of said modulated beam image on said optical detector storage surface comprises means for optical beam deflection of said modulated beam image emerging from said optical spatial filter.

5. An optical processing apparatus as defined in claim 1 wherein said means for spatial displacement of said modulated beam image on said optical detector storage surface includes means for optical beam deflection of said modulated beam image inputted to at least one said optical spatial filter.

6. An optical processing apparatus as defined in claim 1 wherein said means for spatial displacement of said modulated beam image on said optical detector surface includes means for spatial displacement of said optical spatial filter relative to the center of said modulated beam conformed upon it.

7. An optical processing apparatus as defined in claim 1 including means for phase adjustment of the optical phase of at least one said reference beam.

8. An optical processing apparatus as defined in claim 1 including means for spatial displacement of said coherent modulated beam emerging from said optical beam conformer upon successive sets of spatial elements of said optical spatial filter.

9. An optical processing apparatus as defined in claim 1 wherein said optical beam conformer produces a two dimensional beam conformed to the area of said optical spatial filter representing two dimension filter function.

10. An optical processing apparatus as defined in claim 1 wherein said reference beam follows an optical path that includes at least one said means for spatial beam displacement and excludes said optical spatial filter.

11. An optical processing apparatus as defined in claim 1 wherein said signal function is a time sequence of data elements produced by time sequential scan of a two dimensional data field, and wherein said filter function is an optical spatial filter corresponding to a spatial pattern whose presence in said data field is sought, and wherein said convolution integral is thus the cross correlation function for recognition of said pattern in said two dimensional data field.

* * * * *